Aug. 19, 1930. M. O. HANNAH 1,773,530
EXPANDING WING FOR AEROPLANES
Filed Sept. 3, 1929 2 Sheets-Sheet 2

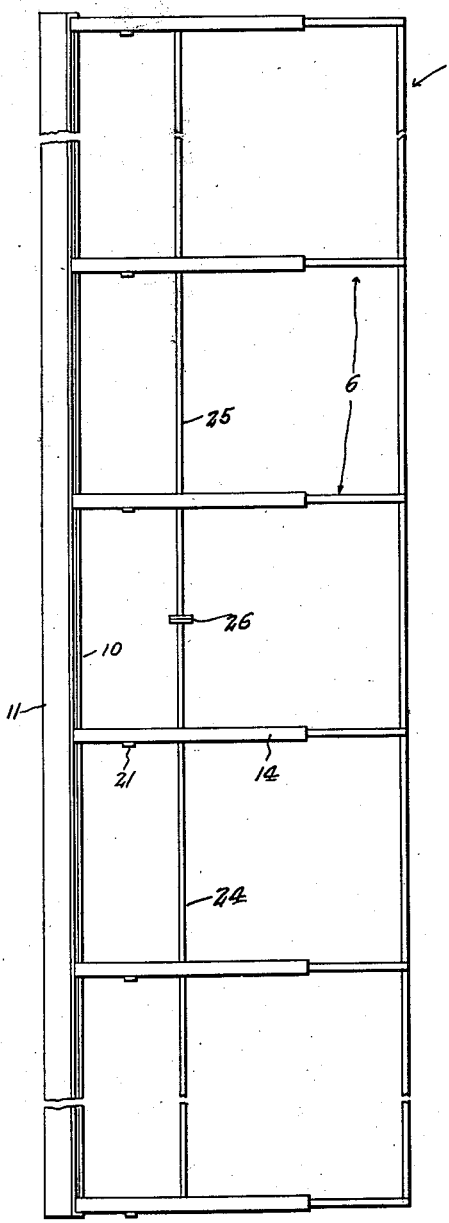
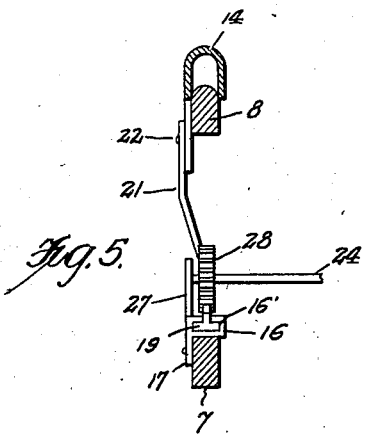
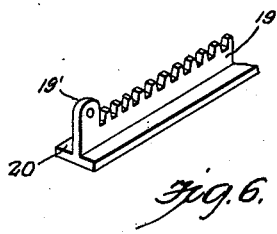
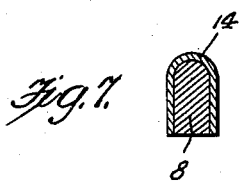

Inventor
Mark O. Hannah,

By Clarence A. O'Brien
Attorney

Patented Aug. 19, 1930

1,773,530

UNITED STATES PATENT OFFICE

MARK OWEN HANNAH, OF GRANBY, MISSOURI

EXPANDING WING FOR AEROPLANES

Application filed September 3, 1929. Serial No. 389,987.

This invention relates generally to aeroplanes, and more particularly to the wing structure for the aeroplanes. The primary object of this invention is therefore, the provision of an improved wing for aeroplanes, the invention comprehending the provision of a wing of the expanding type which will permit of the utilization of but a small landing area for the plane equipped with my improved expanding means for the wing, and which while in flight will enable the pilot to attain the maximum amount of speed, there being but a small amount of drag, and also permits the pilot to cut his landing speed so as to necessitate but comparatively smaller landing space than would be necessary under ordinary existing conditions.

Another object of this invention is to provide an expanding wing which will give to a plane flight, a wing of a thin type, which as well known, has a small lifting capacity, to be driven through the air at a higher rate of speed, and at the same time permit a suitable reduction of speed upon expansion of his wing to permit of a low landing speed, the speed being of course, sufficient to enable the lift to keep up with the decrease in speed to make a safe landing.

Another object of this invention, is to provide an expanding wing of the character above-mentioned, which may be controlled from the operator's compartment of the aeroplane, conveniently by the operator, the device consisting more in the nature of an attachment to the ordinary monoplane type of wing, or other such types of wings, without materially departing from the conventional structure of such wings.

Another very important object of this invention, is to provide a wing of the expanding type, which is relatively simple in construction, strong, durable, positive and efficient in operation, and otherwise, well adapted to the purpose designed.

Other objects and advantages of the invention will become apparent, during a study of the following description, taken in connection with the accompanying drawings, wherein:—

Figure 1 is a top plan view of a wing frame of conventional construction, and showing the application of my invention thereto.

Fig. 5 is a vertical transverse sectional view, taken substantially on the line 5—5 of Fig. 3 and looking in the direction of the arrows.

Fig. 6 is a perspective view of the rack bar.

Fig. 7 is a detail sectional view, taken substantially on the line 7—7 of Fig. 2.

Figure 2:
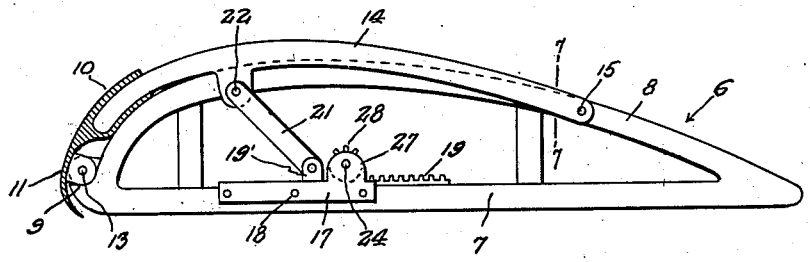
Fig. 2 is a side elevation of a conventional wing brush showing my improved expanding device associated therewith, the same being shown in a telescoped closed position.

With reference more in detail to the drawings, and especially to Fig. 1, it will be seen that I have designated generally, by the reference character 5, the frame of an ordinary or conventional wing structure. First the cross braces or ribs 6 are supported transversely of the plane, and as shown these ribs 6 are likewise of conventional structure. For the sake of clarity, I have designated the horizontal bar of the rib structure 6 by the reference character 7, and an upper or curved bar by the reference character 8.

At the leading edge of the wing, each of the ribs 6 are extended outwardly as at 9 for a purpose to be hereinafter more fully set forth. The invention per se, consists in the provision in an auxiliary leading edge or movable nose for the wing, said movable nose consisting substantially in an elongated U-shaped trough 10. The trough 10, extends across the leading edge of the wing, for the full length of the wing, and is of such a shape as to conform to the rounded leading edge of each of the aeroplane ribs 6.

Figure 3:
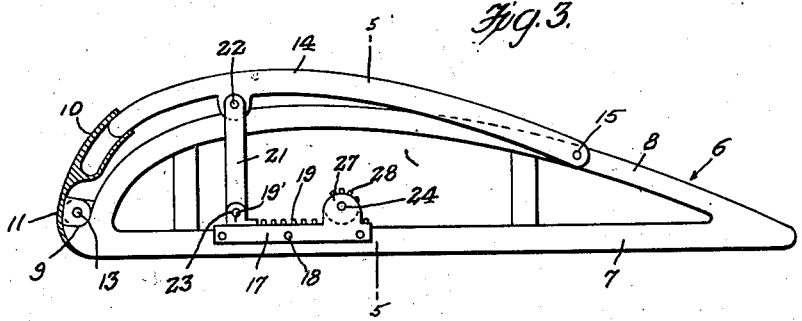
Fig. 3 is a view similar to Fig. 2, showing my improved device in an open or expanded position.
Figure 4:
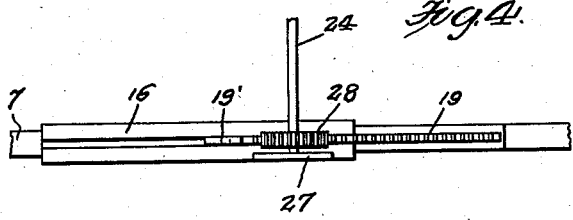
Fig. 4 is a fragmentary top plan view of the rack and pinion mechanism shown in Figs. 2 and 3.
Figure 8:
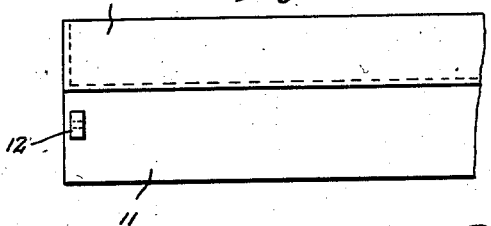
Fig. 8 is a fragmentary side elevation of the trough or auxiliary meeting edge of the wing, constructed in accordance with the present invention.

The trough 10 is provided with a downwardly extending inwardly curved apron 11, extending for the full length of the trough, the outer wall of the trough 10 at the apron 11, constituting the rounded leading edge of the aeroplane wing, as shown to advantage in Figs. 1 to 3 inclusive. The apron portion 11 of the trough is provided with inwardly directed apertured lugs 12, which lugs rest within the seats 9 formed in the leading edge of the wing ribs 6, as shown. Adjacent their seats 9 the ribs 6 are provided with suitably apertured lugs 12, and a pivot rod 13 extends through the apertured lugs 12 and 11 respectively, providing a hinge joint between the apron 11 of the trough 10 and the respective wing ribs 6.

Cooperating with the trough 10 and secured to each of the wing ribs 6 is a curved bar 14, which bar 14, is of channel-shaped formation, as clearly shown in Fig. 5, and the curvature of the channel bars 14 are of such configuration as to conform to the curvature of the upper member 8, of the ribs 6.

These bars 14 are each pivotally connected as at 15 to the upper member 8 of the ribs 6, and the free ends of these bars are telescopically received in the trough 10. In this connection it is to be noted that the member 8 is receivable in the channel of the bars 14, the upper end of the member 8 having the bar 14 movable toward and away from said member. At the free end the bar 14 is telescopically received in the trough 10 with the result that the actuation of the bars 14 will impart movement to the trough 10, said trough 10 being movable upon its pivotal connection with the ribs 6 of the wing.

For actuating the bars 14 upon their pivotal connections 15 for being raised or lowered to provide an alternating expanding and contracting top surface for the wing, there is secured to the horizontal member 7 of the respective ribs 6, an elongated channeled plate 16, said channeled plate 16 resting upon the top edge of the rib member 7, said channel plate 16 being further provided with a downwardly depending flange 17 resting adjacent the adjacent side of the rib members 7 and secured thereto thru the medium of suitable bolts or other securing elements 18.

Thus the channel 16 is held securely and immovable on the member 7 on the respective ribs 6. Slidable longitudinally within the channel 16 is a rack bar 19, which rack bar 19 is provided with lateral extensions 20, receivable in guides 16' extending longitudinally of the channel bar 16. A link 21 is hingedly connected as at 22 to the channel member 14 adjacent the forward end of said member, said link 21 being also pivoted as at 23, to a lug 19' formed on the forward end of the rack bar 19.

Sections 24 and 25, respectively, of a sectional shaft are secured together as at 26, said shaft sections at their opposite ends in bearings 27 formed on the rear ends of the guide channels 16. The intermediate portions of the shaft sections 24 and 25 respectively, are of course supported in similar bearings 27 of the channel frames 16 which are secured to the intermediate ribs 6 of the aeroplane wing, as is obvious.

Secured to the shaft sections 24 and 25 respectively, are pinions or plane gears 28, each of which gears 28 are adapted for mesh with the teeth of the rack bars 19, with the result that upon rotation of the shaft sections 24 and 25, the rack bars will reciprocate within their respective channel frames 16, for raising or lowering the members 14 and consequently moving the troughs 10 upon their pivotal connections.

In practice of course, after my expanding device has been secured to the wing heads 6 as just explained, a suitable covering not shown in place thereover, as in the manner conventional to aeroplane wing constructions. Of course, it is to be understood that the covering will be such as to permit the operation of my expanding and contracting device.

In view of the simiplicity of my device, it is believed that a fair knowledge of the construction, operation and advantages of a device of this nature, will be obtained from the following description taken in connection with the accompanying drawings. A more detailed description thereof is therefore deemed unnecessary.

It is to be understood that while I have herein shown and described the preferred embodiment of my invention, the same is susceptible to changes fully comprehended by the spirit of the invention as herein described and the scope of the appended claims.

Having thus described my invention, what I claim as new is:—

1. In an aeroplane wing, wherein the same comprises a frame and supporting strips extending transversely of the frame, a trough member pivotally secured to the frame at the leading edge of the wing, a member pivoted at one end to an intermediate portion of each of the supporting strips, said member having its opposite end telescopically received within said trough, and means for operating said last-mentioned member for simultaneously operating said trough and said member to provide an expanded surface for the wing.

2. In combination with a wing, wherein the wing comprises a frame, cross members in the frame, each of said cross members embodying a rounded forward end constituting the leading edge of the wing, of an elongated trough member movably secured to the frame of the wing, at the leading edge of the wing, and adapted to be arranged relative to the wing to constitute its leading edge, an elongated curved bar secured to the curved portion of each rib, means for pivotally securing one end of said bar to each rib, the opposite end of said bar adapted for telescopic engagement with the trough, and means for raising or lowering the said curved bar for positioning said trough for effecting the desired adjustment of the wing.

3. In combination with a wing, wherein the same comprises a frame and curved strips extending transversely of the frame, of an elongated trough adapted to extend for the full length of the frame across the leading edge of the frame, means for pivotally connecting said trough to the frame, whereby said trough constitutes a leading edge of the wing, a plurality of curved bars, means for pivotally connecting each of said bars, to the upper edge of the ribs of the frame, said bars having their free ends telescoping within said trough, for moving said trough upon its pivotal connection, and means operable to move said bars for effecting a simultaneous adjustment between the bars and said trough for presenting a retracted or expanded wing.

4. In an aeroplane wing of the class described, a frame, transversely extending spaced supporting ribs carried by the frame, said ribs having their upper portions curving rearwardly to provide a leading and trailing edge for the wing, an elongated trough secured to said ribs, at the leading edge of the wing, means for pivotally connecting said trough to said ribs, bars pivoted at one end to said ribs, said bars conforming to the curved edge of said ribs, said bars having their free ends telescoping within said trough for effecting a movement of the trough upon its pivotal connection, upon pivotal movement of said bars, for effecting an expanded or retracted wing surface, and means for operating said pivoted bars, said means comprising a plurality of rack bars means for slidably supporting said rack bar on the ribs of said frame, links connecting the respective pivoted bars to said rack bars, a shaft supported in the frame, means for rotatably supporting the shaft, pinions on the shaft, and adapted for mesh with said rack bars, and means for rotating the shaft for imparting sliding movement to said rack bars for affecting the raising and lowering simultaneously of said pivoted bars, to provide an expanded or retracted surface for the wing.

5. In combination, a wing structure including a frame, supporting ribs extending transversely of the frame, an elongated trough member, an apron depending from said trough member, means for pivotally securing said apron to the forward edge of the frame, a plurality of members pivoted at one end to the intermediate portions of said ribs, said members having their free ends slidably receivable in said trough member, rack bars slidable on said ribs, means for slidably mounting said rack bars on the ribs, an operating connection between said rack bars and said members, and means for simultaneously actuating said rack bars for effecting a raising or lowering of said members for moving said troughs toward or away from the ribs.

6. In combination, a wing structure including a frame, supporting ribs extending transversely of the frame, an elongated trough member, an apron depending from said trough member, means for pivotally securing said apron to the forward edge of the frame, a plurality of members pivoted at one end to the intermediate portions of said ribs, said members having their free ends slidably receivable in said trough member, rack bars slidable on said ribs, means for slidably mounting said rack bars on the ribs, an operating connection between said rack bars and said members, and means for simultaneously actuating said rack bars for effecting a raising or lowering of said members for moving said troughs toward or away from the ribs, said last mentioned means including a shaft, pinions on the shaft meshing with said rack bars, and means for rotating said shafts.

In testimony whereof I affix my signature.

MARK OWEN HANNAH.